United States Patent [19]

Srivatsa et al.

[11] Patent Number: 5,259,969
[45] Date of Patent: Nov. 9, 1993

[54] DEINKING OF IMPACT AND NON-IMPACT PRINTED PAPER

[75] Inventors: Narendra R. Srivatsa, Ramsey, N.J.; Richard R. Wesolowski, Pine Island; Dennis J. Kerstanski, Warwick, both of N.Y.

[73] Assignee: International Paper Company, Purchase, N.Y.

[21] Appl. No.: 760,645

[22] Filed: Sep. 16, 1991

[51] Int. Cl.$^5$ ................................................ C09K 3/00
[52] U.S. Cl. ...................................... 252/60; 252/162; 162/5
[58] Field of Search ...................... 162/5; 252/60, 162

[56] References Cited

U.S. PATENT DOCUMENTS

| | | | |
|---|---|---|---|
| 3,963,560 | 6/1976 | Mestetsky et al. | 162/5 |
| 4,231,841 | 11/1980 | Calmanti et al. | 162/5 |
| 4,276,118 | 6/1981 | Quick | 162/5 |
| 4,360,439 | 11/1982 | Calmanti et al. | 252/61 |
| 4,561,933 | 12/1985 | Wood et al. | 162/5 |
| 4,618,400 | 10/1986 | Wood et al. | 162/5 |
| 4,657,561 | 4/1987 | Itoh et al. | 44/51 |
| 4,666,558 | 5/1987 | Wood et al. | 162/5 |
| 4,749,473 | 6/1988 | Shoiri et al. | 209/164 |
| 4,820,379 | 4/1989 | Darlington | 162/5 |
| 4,865,690 | 9/1989 | Bernard et al. | 162/4 |
| 4,919,754 | 4/1990 | Mollett et al. | 162/5 |

OTHER PUBLICATIONS

B. D. Sparks & I. E. Puddington "Deinking of waste news by absorption of contaminants on a hydrophobic particulate solid", TAPPI vol. 59 No. 11, Nov. 1976, pp. 117–119.

T. H. Quick's K. T. Hodgsan "Xerography deinking—a fundamental approach", TAPPI, Mar. 1986, pp. 102–106.

W. B. Darlington "A new process for deinking electrostatically printed secondary fiber", TAPPI Jan. 1989, pp. 35–38.

*Primary Examiner*—Asok Pal
*Assistant Examiner*—P. Achutamurthy
*Attorney, Agent, or Firm*—Ostrager, Chong & Flaherty

[57] ABSTRACT

Deinking of impact and nonimpact printed paper is accomplished by repulping and defibering the printed paper in an alkali aqueous medium containing a deinking chemical to form an ink pulp medium. The presence of the deinking chemical causes separation of ink particles from the printed paper fibers. Removal of the ink particles from the ink pulp medium is accomplished by screening, flotation, forward cleaning, reverse cleaning, washing and mechanical dispersion procedures to produce a substantially ink free pulp medium. This substantially ink free pulp medium has a speck removal and brightness level sufficient to produce a high-grade recyclable grade paper product. The invention provides a deinking composition comprised of a mixture of one or more solvents, and nonionic and anionic surfactants, capable of high ink removal from all types of impact and nonimpact printed paper.

15 Claims, 2 Drawing Sheets

DEINKING OF IMPACT AND NON-IMPACT PRINTED PAPER

FIELD OF INVENTION

This invention generally relates to a method to deink impact and nonimpact printed paper. More particularly, it concerns a deinking composition and related process capable of deinking impact and nonimpact printed paper by dispersion and flotation procedures.

BACKGROUND ART

In the past paper was printed with primarily water or oil based inks which were satisfactorily removed by conventional deinking procedures. In conventional deinking procedures, paper is mechanically pulped and contacted with an aqueous medium containing a deinking chemical. The pulping and presence of the deinking chemical resulted in a separation of the ink from the pulp fibers and the dispersed ink is then separated from the pulp fibers by washing or flotation processes.

Today, increasing amounts of printed paper are generated from electrophotographic processes such as xerography and non-impact printing processes such as laser and ink-jet printing. Processes and deinking chemicals capable of deinking these types of printed paper are very complex and are capital intensive. In addition, multiple steps are required for debris removal and actual ink removal. Generally, ink removal procedures involve washing, flotation, forward cleaning and high consistency dispersion to reach the level of speck removal and brightness required in the deinked pulp to create recyclable paper.

U.S. Pat. Nos. 4,666,558, 4,618,400 and 4,561,933 to Wood et al. are representative of processes involving washing and flotation procedures to deink wastepaper. However, these methods employ deinking compositions containing alcohol ethoxylate surfactants that are limited to deinking either newsprint or xerographic printed paper.

U.S. Pat. Nos. 4,231,841 and 4,360,439 to Calmanti et al disclose chemical compositions used in deinking processes consisting of a mixture of five components which are respectively, a salt of a fatty acid, ethoxylated and-/or propoxylated surfactants, sulphonates or sulphates, sodium carboxymethylcellulose and an alkali inorganic salt. The deinking compositions of Calmanti '841 and '439, however, also have limited capabilities and are used in the washing process for deinking news and magazine printed wastepaper.

Thus the present practice, employing known deinking processes and chemicals, has problems in deinking a wide variety of impact and non-impact printed paper. The inventions and practice to date, deal with deinking chemicals having limitations to specific inks and deinking processes which require complex and expensive procedures to obtain recyclable grade paper.

There is a need in the art for deinking chemicals and processes which cause removal of all types of inks, both impact and nonimpact, for all grades of paper. This invention is directed to the provision of such a deinking chemical and related process which has wide range applications in creating recyclable grade paper. It will be appreciated that advantage over conventional deinking chemicals would be obtained by providing an effective and efficient deinking composition capable of deinking all types of printed paper.

Accordingly, it is a broad object of the invention to provide a deinking composition and related process for the removal of all types of inks, both impact and nonimpact, from wood containing and wood free grades of paper.

A more specific object of the invention is to provide a deinking composition comprising a mixture of one or more solvents and nonionic and anionic surfactants for the removal of all types of inks, both impact and nonimpact, from wood containing and wood free grade of paper.

Another object of the invention is to provide a deinking composition capable of both dispersion and collection of all types of inks, both impact and nonimpact, from wood containing and wood free grade of paper.

Another object of the invention is to provide a low cost deinking process and apparatus that effectively and efficiently removes ink without using a high concentration of expensive deinking chemicals.

A further specific object of the invention is to provide a recycled paper product made by the deinking process of the invention from impact and/or nonimpact printed paper.

DISCLOSURE OF INVENTION

In the present invention, these purposes, as well as others which will be apparent, are achieved generally by providing a deinking composition and related process capable of deinking impact and nonimpact printed paper. The general deinking process of the invention comprises the steps of repulping and defibering the printed paper in an alkali aqueous medium containing the deinking composition, which causes the ink particles to separate from the printed paper fibers to form an ink pulp medium, and removal of the ink particles from the ink pulp medium to produce a substantially ink free pulp medium.

Process and reaction conditions are controlled during contact with the deinking composition so that effective removal of the ink particles is accomplished. Concentrations of the deinking composition, as well as the pH and temperature of the aqueous medium are adjusted to yield maximum removal of the ink particles.

The separated ink particles are removed by screening, flotation, forward cleaning, reverse cleaning, washing and mechanical dispersion procedures. In alternate embodiments of the process of the invention the ink removal steps and process sequence may vary. Variations possible are defined according to a given product desired and cost/quality criterion.

After removal of the ink particles the substantially ink free pulp medium has a speck removal and brightness level sufficient to produce high-grade recyclable paper.

The deinking composition used in the invention functions as both a dispersant and collector of ink particles. During the repulping and defibering stage the deinking composition causes dispersion of the ink after allowing separation of the ink particles from the printed paper fibers. The composition functions as a collector during the flotation procedure, whereby air is introduced into the ink pulp medium causing air bubbles to carry the ink particles to the surface to be removed.

The deinking composition of the invention consists of a mixture of one or more solvents, nonionic surfactants and anionic surfactants. The solvents of the composition are selected from the group consisting of alcohols and methylated phenolic compounds and are present in the range of 0 to 2% by weight of the deinking chemical.

The most preferred solvents are 2 Butoxyethanol and 1,2,4 Trimethyl Benzene and are present in the range of 0 to 2% and 1 to 2%, respectively. The nonionic surfactant is present in the range of 0 to 30% by weight of the deinking chemical, preferably between 0 to 25%. Any of a wide variety of nonionic surfactants may be employed in the invention, including polyoxyalkylether, poloxyethylenephenol ether, oxyethylene-oxypropylene block copolymer, polyoxyethylenealkylamine, sorbitan fatty acid ester, polyoxyethylenesorbitan fatty acid ester, polyethylene glycol esters and diesters or any other nonionic surface agents with wetting power to reduce the surface tension of water molecules. Preferred nonionic surfactants are selected from the group consisting of nonylphenol ethoxylates containing an average of 7-12 ethoxy groups and having a hydro-lipophobic balance ranging from 7-12. The anionic surfactant is present in the range of 0 to 30% by weight of the deinking chemical, preferably between 7 to 25%. Preferred anionic surfactants are selected from the group consisting of either linear alkyl-benzene sulfonates having from 8-14 straight chain carbon groups or acid esters. The total surfactant composition of the deinking chemical is not more than 30% by weight.

In addition, the deinking chemical may be used in the presence of other chemicals suitably employed in a deinking or papermaking process such as bleaching agents, defoamers, sizing agents, brighteners and water quality processing agents.

Preferred applications of the deinking composition of the invention include use in deinking impact and nonimpact printed paper to produce high-grade recyclable paper. Advantageously, the deinking composition of the invention provides a process that is less complex and expensive than known deinking processes.

The invention also provides an apparatus for deinking impact and/or nonimpact printed paper utilizing a repulping means, a separation means, a removal means and a production means to produce recyclable grade paper.

Other objects, features and advantages of the present invention will be apparent when the detailed description of the preferred embodiments of the invention are considered in conjunction with the drawings, which should be construed in an illustrative and not limiting sense as follows:

DETAILED DESCRIPTION OF THE PREFERRED EMBODIMENT

As used in the specification the terms impact and nonimpact printed paper refer to paper printed by impact processes as in offset printing or other mechanical printing and nonimpact processes as in laser printing photocopying or other processes where the ink is fused onto the paper.

Figure 1:
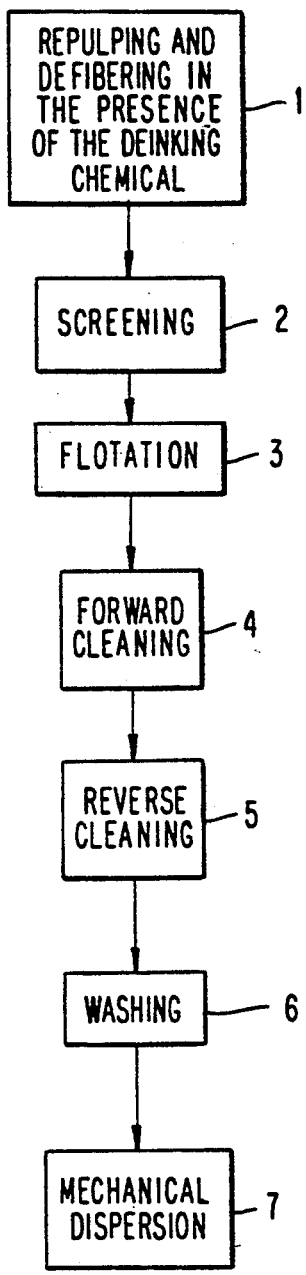
FIG. 1 is a diagrammatic view of the process for deinking of impact and nonimpact printed paper.

With further reference to the drawings, FIG. 1 is a diagrammatic view of the general process steps for the deinking of impact and nonimpact printed paper.

At step 1, repulping and defibering of the printed paper is effected in the presence of a deinking chemical which causes the ink particles to separate from the printed paper fibers to form an ink pulp medium. The ink pulp medium is then passed through screens at step 2 to remove coarse and fine contaminants such as staples, dirt or other debris. Larger ink particles are removed by flotation procedures in step 3. The ink pulp medium is passed through forward cleaning station 4, and reverse cleaning station 5, to remove heavier contaminants and lightweight contaminants respectively. Washing 6 of the ink pulp medium is done to remove fine ink particles and increase the brightness of the pulp and is followed by mechanical dispersion procedures 7, which breaks down the remaining ink particles to particles below the size visible to the human eye. The resulting substantially ink free pulp medium is used to produce a high-grade recyclable paper product by conventional paper making techniques.

In alternate embodiments of the process of the invention the ink removal steps and process sequence set forth may vary. The general process steps and sequence for removal of the separated ink particles from the ink pulp medium include screening, flotation, forward cleaning, reverse cleaning, washing and mechanical dispersion. The variations possible are defined according to a given product desired and cost/quality criterion.

Figure 2:
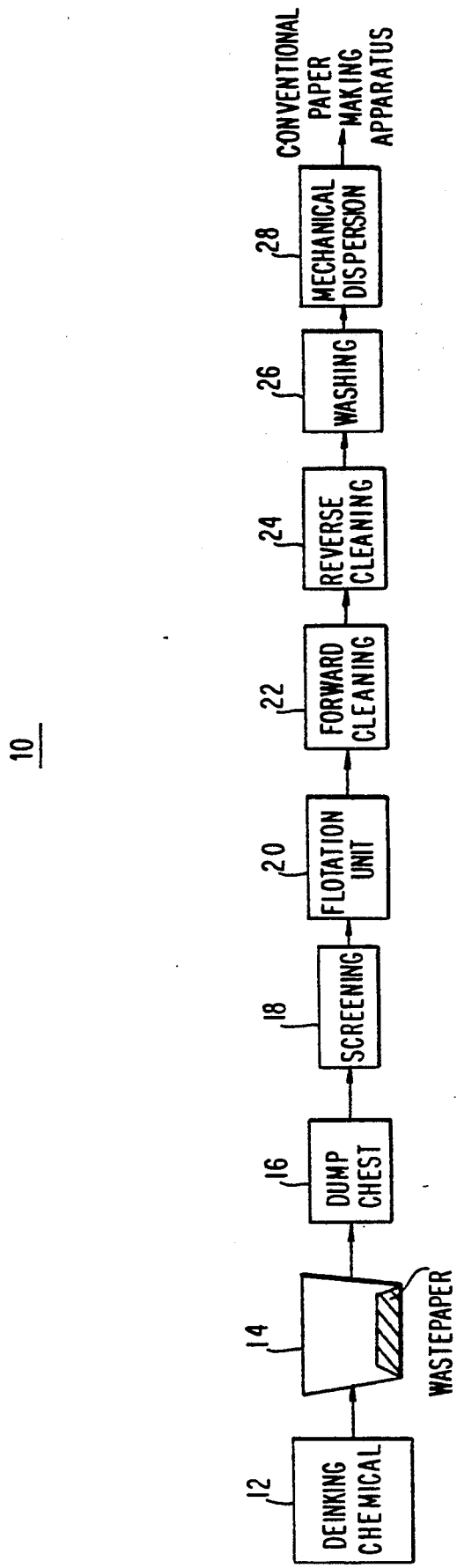
FIG. 2 is a schematic view of the apparatus for deinking of impact and nonimpact printed paper.

FIG. 2 is a schematic view of an apparatus, generally 10, for the deinking process of the invention. The specific process of the invention involves repulping and defibering the wastepaper in the presence of the deinking chemical to cause separation of the ink particles from the printed paper fibers and removing the separated ink and contaminants by screening, flotation, centrifugal cleaning (forward and reverse), washing and mechanical dispersion.

The printed paper is repulped and defibered in an alkali aqueous medium containing the deinking chemical at hydrapulper, 14. In a preferred embodiment of the invention, the printed paper is cellulosic material including both wood containing and wood free grades of paper. Table I presents various types of printed paper which may be used in this invention. This table is representative of the different types of printed paper and is not considered to be inclusive of all the possible types of printed paper which may be used in the invention.

TABLE I

| TYPES OF PRINTED PAPER |
| --- |
| COMPUTER PRINTOUT PAPER |
| WRITING PAPER |
| FINE PAPER |
| COATED/UNCOATED MAGAZINE |
| COATED PUBLICATION GRADES |
| MANILA FILE FOLDERS |
| NEWSPRINT |
| PACKAGING BOARD |

The presence of the deinking chemical 12, causes separation of the ink particles from the printed paper fibers to form an ink pulp medium. Preferably the deinking chemical dosage is in the range of 0.3 to 3.0% by weight of oven dry (O.D.) fiber. Process and reaction conditions are controlled during repulping so that effective removal of the ink particles is accomplished. Concentrations of the deinking chemical, as well as the pH and temperature of the aqueous medium are adjusted to yield maximum separation and removal of the ink particles from the paper fibers. Typical repulping conditions are in the pH range of 8 to 11.5, at 3 to 30% consistency, 25° to 60° C. and between 5 to 30 minutes.

The deinking composition of the invention consists of a mixture of one or more solvents and nonionic and anionic surfactants. The solvents of the composition function as both a dispersant and collector of the ink particles. During the repulping and defibering stage the deinking composition causes dispersion of the ink after allowing separation of the ink particles from the printed paper fibers. The composition functions as a collector during the flotation procedure, whereby air is introduced into the ink pulp medium causing air bubbles to carry the ink particles to the surface to be removed.

The solvents of the deinking composition are selected from the group consisting of alcohols and methylated phenolic compounds and are present in the range of 0 to 2% by weight of the deinking chemical. The most preferred solvents are 2 Butoxyethanol and 1,2,4 Trimethyl Benzene and are present in the range of 0 to 2% and 1 to 2%, respectively.

The nonionic surfactant is present in the range of 0 to 30% by weight of the deinking chemical, preferably between 0 to 25%. Any of a wide variety of nonionic surfactants may be employed in the invention, including polyoxyalkylether, poloxyethylenephenol ether, oxyethylene-oxypropylene block copolymer, polyoxyethylenealkylamine, sorbitan fatty acid ester, polyoxyethylenesorbitan fatty acid ester, polyethylene glycol esters and diesters or any other nonionic surface agents with wetting power to reduce the surface tension of water molecules. Preferred nonionic surfactants are selected from the group consisting of nonylphenol ethoxylates containing an average of 7-12 ethoxy groups and having a hydro-lipophobic balance ranging from 7-12.

The anionic surfactant is present in the range of 0 to 30% by weight of the deinking chemical, preferably between 7 to 25%. Preferred anionic surfactants are selected from the group consisting of either linear alkylbenzene sulfonates having from 8-14 straight chain carbon groups or acid esters.

The total surfactant composition of the deinking chemical is not more than 30% by weight.

In addition, the deinking chemical may be used in the presence of other chemicals suitably employed in a deinking or papermaking process such as bleaching agents, defoamers, sizing agents, brighteners and water quality processing agents.

After repulping, the ink pulp medium is passed to dump chest 16, and then through coarse and fine screens 18, to remove large ink balls, any plastic, adhesives, flakes, staples or other coarse contaminants. Any commercially available screen can be used in the invention process and can be arranged in a number of different sequences based on desired cleanliness and fiber recovery. The screening conditions are usually at 0.7 to 3.0% consistency, 25° to 55° C. and pH of 7 to 10.

Separated ink particles are removed from the ink pulp medium at a flotation station 20. The flotation unit consists of any commercially available apparatus arranged to give maximum fiber yield and ink removal. Removal of the separated ink particles is accomplished by introducing air into the ink pulp medium, via the flotation apparatus, whereby air bubbles carry the ink particles to the surface of the ink pulp medium to be removed. The flotation step is generally carried out at 0.5 to 2.0% consistency, 25° to 60° C. and pH 7.5 to 11.5. This step is useful in removing non-impact type of printed inks and particularly ink particles in the range of 20 to 200 microns.

The ink pulp medium can be passed through forward cleaning 22, and reverse cleaning 24, stations to further remove heavier and lighter ink particles/contaminants respectively. Typical process conditions for forward cleaning are at 0.6 to 1.2% consistency, 35° to 55° C., and for reverse cleaning are at 0.5 to 1.0% consistency, 35° to 55° C.

These procedures are followed by washing at 0.2 to 0.6% consistency, 25° to 45° C. with a sidehill screen, gravity decker or any other similar apparatus 26, to remove fine ink particles. This step contributes to the improved brightness of the pulp. The washing is followed by mechanical dispersion 28, which breaks down the remaining ink particles to particles below the size visible to the human eye.

The process sequence for removal of the separated ink particles from the ink pulp medium by screening, flotation, forward cleaning, reverse cleaning, washing and mechanical dispersion need not be carried out necessarily in the order set forth. Variations possible are defined according to a given product and cost/quality criterion.

After removal of the ink particles, the substantially ink free pulp medium has a speck removal and brightness level sufficient to produce high-grade recyclable paper products by conventional papermaking techniques.

In the following examples, deinking of impact and nonimpact printed paper was achieved on a process line and apparatus as shown in FIGS. 1 and 2.

EXAMPLE I

The following example compares the effectiveness of various deinking compositions for the removal of ink particles from the ink pulp medium during the flotation step of the invention.

Uniformly printed, offset, white ledger paper was repulped at 15% consistency, pH 11, 50°-55° C. for 15 minutes in the presence of 0.5% of a deinking chemical based on air dry (A.D.) weight of paper. The brightness of the unprinted section of the paper stock was 77.9 G.E.

The ink pulp medium was deflaked for 10 seconds at 15500 rpm in a Waring blender to defiber the wastepaper and allow separation of the ink from the paper fibers.

The flotation step was carried out at 0.5% consistency for 10 minutes in a Voith lab cell, manufactured by Voith Company, Germany. Approximately 10% were taken out as rejects.

Table II below sets forth different deinking chemical compositions and the resulting brightness and dirt count measurements on the ink pulp medium, accepts and rejects of the flotation cell.

Standard Technical Association of the Pulp and Paper Industry ("TAPPI") procedure numbers T437 (paper and paperboard) and T213 (pulp) were used to measure dirt count and removal. The TAPPI procedure refers to any visible speck above 0.04 $mm^2$ as dirt.

TABLE II

| CHEMICAL EFFECT ON FLOTATION DEINKING | | |
|---|---|---|
| DEINKING COMPOSITION CHEMISTRY | DIRT COUNT (ppm) IN ACCEPTS | % DIRT REMOVAL |
| NONYLPHENOL ETHOXYLATE/ LINEAR ALKYLBENZENE SULFONATE/SOLVENTS | 3 | 66.7 |

TABLE II-continued

CHEMICAL EFFECT ON FLOTATION DEINKING

| DEINKING COMPOSITION CHEMISTRY | DIRT COUNT (ppm) IN ACCEPTS | % DIRT REMOVAL |
|---|---|---|
| OCTYLPHENOXYPOLYETHOXY-ETHANOL | 35 | 25.6 |
| ETHOXYLATED ACID ESTER | 52 | 31.6 |
| POLYOXYETHYLENE TRIDECYL ALCOHOL | 54 | 47.5 |
| FATTY ALCOHOL OXIDE DERIVATIVE | 100 | 35.2 |
| NONYLPHENOL ETHOXYLATE/ OLEOYL TAURATE | 148 | 14.9 |
| POLYALKYLENE OXIDE | 554 | 30.8 |
| ALKALI (NaOH - pH 10) | 656 | 0.0 |

EXAMPLE II

The following example sets forth the effect of the deinking composition and process of the invention on a variety of printed wastepaper furnishes.

Table III lists the types of wastepaper used in this example. Wastepaper was repulped at 15% consistency, pH 11, 50°-55° C. for 15 minutes in the presence of 0.5% of a deinking chemical based on A.D. weight of paper. The deinking chemical used in this example was comprised of a mixture of nonylphenol ethoxylate, linear alkyl-benzene sulfonates, solvents and water.

TABLE III

WASTEPAPER FURNISHES IN EXAMPLE II

| WASTEPAPER TYPE | COMPOSITION |
|---|---|
| PRECONSUMER WHITE LEDGER | Consists mostly of unused outdated forms from office waste streams and some coated paper (<1%). No staples, rubber bands etc. |
| POSTCONSUMER WHITE LEDGER | Consists of impact/nonimpact/hand written inks on white ledger. Some sticker labels, rubber bands and staples. |
| COLORED LEDGER | Consists of interoffice envelopes, NAACP forms with offset pictures; over 95% is color (light blue, purple, green, red, etc.); impact/nonimpact printed; labels, rubber bands and staples. |
| POSTCONSUMER COLORED LEDGER | Consists of green carbonless forms (approx. 15% by wt.); light pink, blue, green colors; over 95% is color; impact/nonimpact/handwritten inks; labels, rubber bands and staples |
| LASER FREE CPO | Consists of computer listings with no laser inks. |
| MIXED CPO | Consists of laser and laser free computer listings. |
| LASER CPO | Consists of laser printed computer listings. |
| MIXED WASTE | Consists of an equal mixture by weight of the Preconsumer and Postconsumer White Ledger, Colored Ledger, Postconsumer Color Ledger and Laser free CPO furnishes. This was carried out to generate more randomness to test the versatility of the deinking chemical. |
| CP MIXED WASTE | Consists of mixed waste classified and received. Only ledger and some CPO grade with all inks present. No cups, straws, etc. |

The ink pulp medium was deflaked for 10 seconds at 15500 rpm in a Waring blender to defiber the wastepaper.

The flotation step was carried out at 0.5% consistency for 10 minutes in a Voith lab cell. Approximately 10% were taken out as rejects.

Table IV below sets forth the brightness and dirt count for the accepts, rejects and the ink pulp medium of the flotation step for the various wastepaper furnishes listed in Table III. The brightness gains, dirt and speck removal efficiencies are summarized in Table V.

TABLE IV

BRIGHTNESS AND DIRT COUNT IN EXAMPLE II

| FURNISH | BRIGHTNESS (G.E.) | | | DIRT COUNT (ppm) | | |
|---|---|---|---|---|---|---|
| | PULP | ACCEPT | REJECT | PULP | ACCEPT | REJECT |
| PRECONSUMER WHITE LEDGER | 83.1 | 82.1 | 80.2 | 57 | 31 | 96 |
| POSTCONSUMER WHITE LEDGER | 77.4 | 77.9 | 61.3 | 8297 | 251 | 42047 |
| COLORED LEDGER | 71.2 | 72.9 | 68.5 | 100 | 26 | 190 |
| POSTCONSUMER COLORED LEDGER | 54.8 | 55.0 | 52.3 | 1626 | 264 | 6886 |
| LASER-FREE CPO | 79.8 | 78.7 | 80.4 | 31 | 9 | 54 |
| MIXED CPO | 75.5 | 75.0 | 68.9 | 355 | 36 | 1554 |
| LASER CPO | 78.1 | 78.5 | 62.7 | 3945 | 194 | 22693 |
| MIXED WASTE | 72.6 | 72.0 | 72.5 | 1390 | 71 | 960 |
| CP MIXED WASTE PAPER | 61.7 | 62.7 | 58.2 | 845 | 95 | 5248 |

TABLE V

BRIGHTNESS GAIN, % DIRT AND SPECK REMOVAL IN EXAMPLE II

| FURNISH | BRIGHTNESS GAIN (G.E.) | % DIRT REMOVAL | % SPECK REMOVAL |
|---|---|---|---|
| PRECONSUMER WHITE LEDGER | −1 | 46 | 50 |

TABLE V-continued

BRIGHTNESS GAIN, % DIRT AND SPECK REMOVAL IN EXAMPLE II

| FURNISH | BRIGHTNESS GAIN (G.E.) | % DIRT REMOVAL | % SPECK REMOVAL |
|---|---|---|---|
| POSTCONSUMER WHITE LEDGER | 0.5 | 97 | 97 |
| COLORED LEDGER | 1.7 | 74 | 76 |
| POSTCONSUMER COLORED LEDGER | 0.2 | 84 | 86 |
| LASER-FREE CPO | −1.2 | 71 | 53 |
| MIXED CPO | −0.5 | 90 | 92 |
| LASER CPO | 0.4 | 95 | 95 |
| MIXED WASTE | −0.6 | 95 | 95 |
| CP MIXED WASTE | 1.0 | 89 | 89 |

In all the furnishes tested, the brightness differences between the pulp slurry and accepts were negligible, as evident from the brightness values in Table IV and the brightness gain column in Table V. This indicates that flotation is more effective for speck removal rather than for brightness increases. Except for the colored and mixed grade furnishes, the brightness of the flotation accepts with no additional bleaching are fairly high, being in the range of 75 to 82 G.E.

The dirt count for the ink pulp medium, accepts and rejects are given in Table III. It is evident from the results obtained that flotation procedures utilizing the deinking chemical composition of the invention are effective for dirt removal for all types of furnish, to varying degrees.

In some instances, such as with Laser free CPO, just repulping alone in the presence of the deinking chemical, leaves the furnish with a dirt count of 31 ppm. This could find application in mills with no flotation or washing, but with tremendous pressure to have post consumer recycled content in their products such as french fries bags, copier paper etc. Other furnishes that may be applied in this category would be colored ledger or preconsumer white ledger with dirt counts of less than 100 ppm on repulping with no further screening, cleaning, bleaching, or mechanical dispersion procedures.

Postconsumer white ledger, postconsumer colored ledger and laser CPO show dirt counts greater than 100 ppm in their flotation accepts. However, the dirt removal efficiencies for these furnishes is quite high, in the range of 84 to 97%. The high dirt counts are possibly because of the higher presence of nonimpact inks. Nonimpact inks are more difficult to break down than impact inks. This results in more visible dirt (greater than 50 micron size particles) for nonimpact inks than for impact inks. As an example, for laser CPO, the dirt count after repulping is 3945 ppm. In contrast, the preconsumer white ledger with substantial amounts of ink as impact inks, has a dirt count of 57 ppm.

For most of the furnishes, as shown in Table IV, the percent dirt and speck removal are in the 84 to 97% range. This includes the deliberately mixed wastepaper and the commercially available mixed wastepaper. The high dirt removal and speck removal efficiencies for these furnishes indicates the deinking composition is a very good and versatile flotation deinking chemical.

The preconsumer white ledger, colored ledger and laser free CPO furnishes had lower than 80% dirt removal efficiencies. They contained dirt counts less than 101 ppm with just repulping alone, with their flotation accepts having dirt counts ranging from 9 to 31 ppm. These low dirt count values in the accepts were achieved in one flotation step.

EXAMPLE III

100% laserprinted ledger grade was used as wastepaper. The deinking chemical composition contained 1% of Trimethyl Benzene, 1% of 2-Butoxylethanol, 22.5% of Nonylphenolethoxylate and 7.5% of linear alkyl-benzene sulfonate. The deinking chemical was added to the wastepaper at a 0.5% dosage. The wastepaper was repulped at 15% consistency; for 10 minutes at pH 10.5. The ink pulp medium was deflaked at 1% consistency for 10 seconds in a Waring Blender. The flotation step was carried out at 0.8% consistency. The dirt count measurements using standard TAPPI procedure showed a dirt removal of 74.7%.

EXAMPLE IV

100% laserprinted ledger grade was used as wastepaper. The deinking chemical composition contained 1% of Trimethyl Benzene, 1% of 2-Butoxylethanol and 20% of linear alkyl-benzene sulfonate. The deinking chemical was added to the wastepaper at a 0.5% dosage. The wastepaper was repulped at 15% consistency; for 10 minutes at pH 10.5. The ink pulp medium was deflaked at 1% consistency for 10 seconds in a Waring Blender. The flotation step was carried out at 0.8% consistency. The dirt count measurements using standard TAPPI procedure showed a dirt removal of 7.8%.

EXAMPLE V

50% old newsprint and 50% old magazines were used as wastepaper. The deinking chemical composition contained 1% of Trimethyl Benzene, 1% of 2-Butoxylethanol, 22.5% of Nonylphenolethoxylate and 7.5% of linear alkyl-benzene sulfonate. The deinking chemical was added to the wastepaper at a 0.5% dosage. The wastepaper was repulped at 15% consistency; for 10 minutes at pH 9.0, at 50° C. In addition to the deinking chemical, repulping was carried out in the presence of 1% hydrogen peroxide and 1.5% sodium silicate. These additional chemicals were added because of the presence of the newsprint. The flotation step was carried out at 1.0% consistency, 40° C., pH 8. The dirt count measurements using standard TAPPI procedure showed a dirt removal of 88.4%.

Advantageously, the deinking composition of this invention is capable of deinking both impact and nonimpact printed paper. The utilization of a relatively simple treatment process provides a low cost deinking process for all grades of paper.

It will be recognized by those skilled in the art that the invention has wide application in the production recyclable grade paper.

Numerous modifications are possible in light of the above disclosure such as alternative process parameters which may be employed in the invention using the deinking agent with no pH adjustment to the wastepaper; using the deinking agent in an alkali pH range; or using the deinking agent in the presence of other chemicals suitably employed in a deinking and/or papermaking process such as bleaching agents, defoamers, sizing agents, brighteners, water quality processing agents among others.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A deinking composition, capable of both dispersion and collection of ink particles for deinking all types of waste paper, consisting essentially of a mixture of:
   one or more solvents selected from the group consisting of 1,2,4-trimethyl benzene, alcohols, methylated phenolic compounds, and mixtures thereof;
   a nonionic surfactant;
   an anionic surfactant; and
   water.

2. The deinking composition as defined in claim 1, wherein said solvents are present up to 2% by weight of the deinking composition.

3. The deinking composition as defined in claim 1, wherein said solvent is 2-Butoxyethanol and is present up to 2% by weight of the deinking composition.

4. The deinking composition as defined in claim 1, wherein said nonionic surfactant is present up to 30% by weight of the deinking composition.

5. The deinking composition as defined in claim 1, wherein said nonionic surfactant is selected from the group consisting of nonylphenol ethoxylates containing between 7 to 12 ethoxy groups and maintains a hydro-lipophobic balance between 7 and 12.

6. The deinking composition as defined in claim 1, wherein said nonionic surfactant is selected from the group consisting of polyoxyalkylether, poloxyethylene-phenol ether, oxyethylene-oxypropylene block copolymer, polyoxyethylenealkylamine, sorbitan fatty acid ester, polyoxyethylenesorbitan fatty acid ester, polyethylene glycol esters and diesters or any other nonionic surface agents with wetting power to reduce the surface tension of water molecules.

7. The deinking composition as defined in claim 1, wherein said anionic surfactant is present up to 30% by weight of the deinking composition and is selected from the group consisting of linear alkyl-benzene sulfonates or acid esters.

8. The deinking composition as defined in claim 1, wherein the anionic surfactant is a linear alkyl benzene sulfonate having from 8 to 14 carbon groups.

9. The deinking composition as defined in claim 1, wherein both said non-ionic and anionic surfactant composition is not more than 30% by weight of the total deinking composition.

10. The deinking composition as defined in claim 1, wherein said solvents are 2-Butoxyethanol and 1,2,4 trimethylbenzene.

11. The deinking composition as defined in claim 1, wherein said composition is mixed with an alkali aqueous medium maintained at a pH in the range of 8 to 11.5 and at temperatures in the range of 25° to 60° C.

12. The deinking composition as defined in claim 1, wherein during repulping and defibering of the printed paper said composition causes separation and dispersion of ink particles from said printed fibers to form an ink pulp medium.

13. The deinking composition as defined in claim 12, wherein said composition is present at a dosage ranging from between 0.3–3.0% by weight, calculated on the dry weight of the pulp used.

14. The deinking composition as defined in claim 12, wherein said composition causes collection of the separated ink particles which are removed from said ink pulp medium by screening, flotation, forward cleaning, reverse cleaning, washing and mechanical dispersion procedures.

15. The deinking composition as defined in claim 1, wherein said composition is mixed with bleaching agents, defoamers, sizing agents, brighteners and water quality processing agents.

* * * * *